United States Patent Office 3,822,361
Patented July 2, 1974

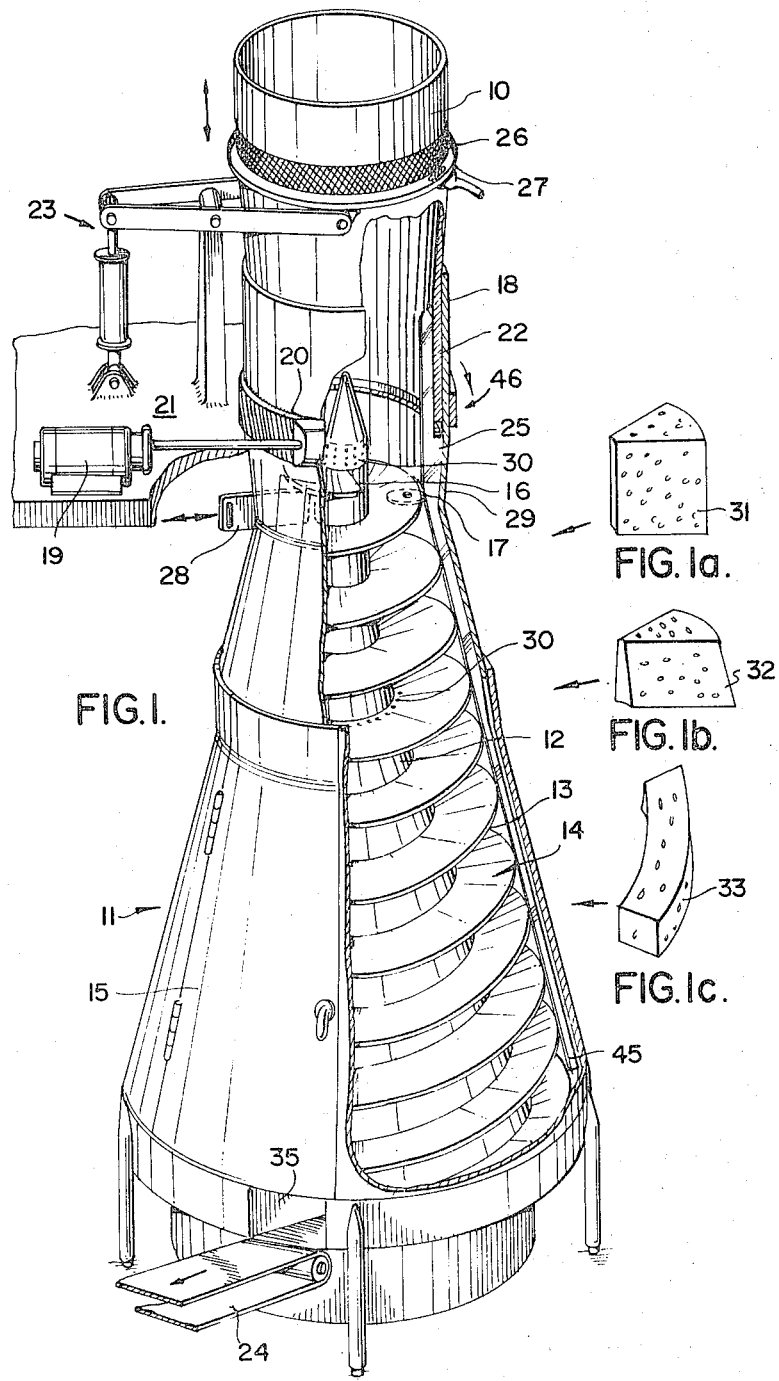

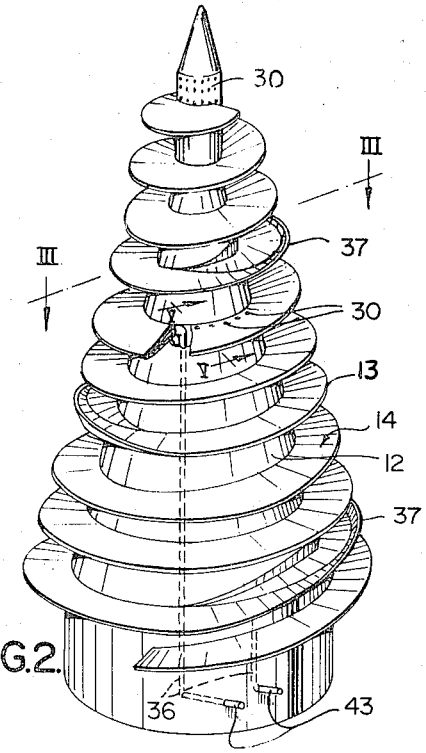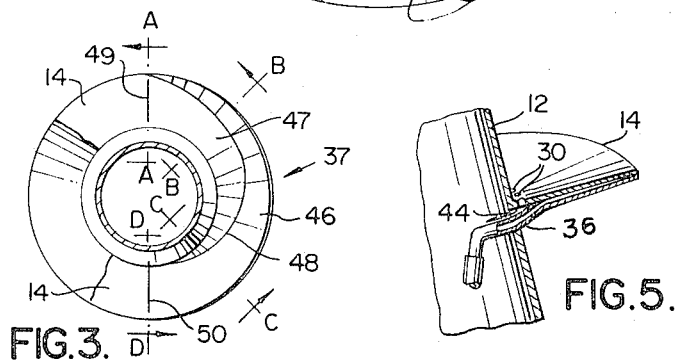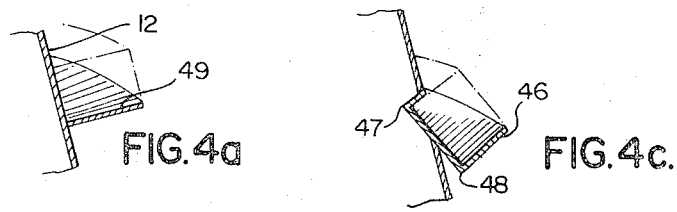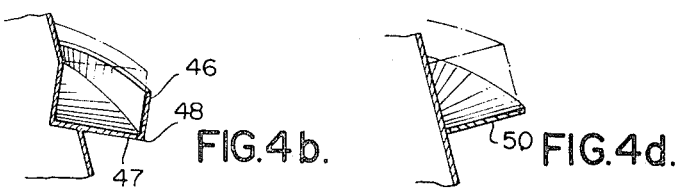

3,822,361
CONTINUOUS PREPARATION OF CHEESE
Owen R. Irvine, Kemptville, Ontario, Canada, assignor to Canadian Patents and Development Limited, Ottawa, Ontario, Canada
Filed Mar. 1, 1973, Ser. No. 337,077
Claims priority, application Canada, Mar. 6, 1972, 136,271
Int. Cl. A23c 19/02
U.S. Cl. 426—491
12 Claims

ABSTRACT OF THE DISCLOSURE

A method and apparatus for the continuous treatment of curd in the manufacture of Cheddar cheese comprising a hopper for receiving the curd, a restricted section to facilitate matting, a spiraled passageway with decreasing cross-sectional area for a ribbon of the curd, the passageway being defined by a cone-shaped base member with a spirled fluting in association with a spaced cone-shaped casing. Rotating impellers with dependent arms feed the curd into the passageway, carry the ribbon along and control the stretching thereof. Provision is made for starting up, draining of whey, periodic twisting of the ribbon of curd and temperature control.

This invention relates to the manufacture of cheese and more particularly to a method and apparatus for the continuous treatment of curd in the manufacture of Cheddar cheese.

In a typical manufacture of Cheddar cheese, milk, which may be unpasteurized, heat-treated or pasteurized and which may have its proportions of casein to fat adjusted, is inoculated with a lactic acid starter and held at a temperature of 70–88° F. until the proper acidity has developed. Next, a milk coagulating enzyme or mixture of enzymes is added and when coagulation takes place, the gel formed is cut into cubes having dimensions of ¼ to ⅜ inches on a side. The curd is then agitated and the temperature raised from 86–88° F. to 100–104° F. in about 30 minutes. Agitation is then continued for another 30–90 minutes while the acidity increases in the curds and whey and the curd particles shrink and expel moisture. When the desired firmness and acidity are attained the whey is drained from the curds. The particles of curd may next be given a series of stirrings to aid drainage of the whey following which the curd particles are packed together and will coalesce together. This mass of curd is then cut into pieces which will facilitate their being manipulated by hand and the pieces turned and/or stacked on one another repeatedly. This part of the process, known as matting or cheddaring the curd, may last for from 40 minutes to 2 hours with the pieces of curd being turned every 10 to 15 minutes. During this stage the curd developes a meat-like texture, the pH is lowered, and the coagulating enzyme(s) brings about changes in the curd. To achieve the desired textural qualities it is advantageous that conditions be set up which will cause the curd to stretch. This is to a large extent achieved by piling one piece of curd on top of another and then interchanging their positions at regular intervals. A small amount of whey drains from the curd during the cheddaring stage of cheesemaking. Proper control of temperature is essential during cheddaring. When judged sufficiently mature, the pieces of curd are cut into smaller sections and diced or milled into strips approximately ½ inch by ½ inch by 3 to 6 inches long. This milled curd may be forked briefly further to condition, cool or aerate it, following which common salt is mixed with it at a rate of approximately 2–2½ percent. The salted pieces of milled cured are then placed in hoops and subjected to pressing which fuses the loose pieces of curd into solid cheeses.

The present invention provides an improved process and apparatus for continuously treating cheese curd and more particularly for effecting matting and stretching thereof in a controlled manner.

The apparatus comprises a curd receiving hopper, a truncated cone-shaped casing disposed below the hopper, a cone-shaped base member disposed within and spaced from the casing, the base member having a spiraled fluting which in association with the casing defines a spiraled passageway for the curd, a rotatable member disposed between the hopper and the casing, a plurality of impellers attached to the rotatable member for rotating the curd and moving it into and along the spiraled passageway, and an outlet in the casing for discharging the treated curd.

The process comprises feeding the curd into a hopper, matting the curd by allowing the curd to pass through a restricted section under gravity onto the apex of a spirally fluted cone-shaped base, rotating the curd, cutting the curd into a continuous ribbon, stretching the curd ribbon as it spirals downwardly and outwardly along the base, and continuously discharging the treated curd.

Preferably the curd ribbon is periodically twisted by a plurality of curd twisting ramps.

The invention will be described with reference to the drawings which illustrate an embodiment of the invention and in which:

FIG. 1 is a perspective view of the apparatus with the casing cut away to reveal the cone-shaped base member.

FIGS. 1(a), (b), and (c) show fragments of the cheese at various stages in the apparatus of FIG. 1.

FIG. 2 shows a second embodiment of the base member.

FIG. 3 is a fragmented top view taken at III—III of FIG. 2.

FIGS. 4(a) to 4(d) are sectional views taken at A—A to D—D respectively of FIG. 3.

FIG. 5 is a section of the fluting taken at V—V of FIG. 2.

With reference to FIG. 1 the curd treating apparatus comprises a curd receiving hopper 10, a truncated cone-shaped casing 11 disposed below the hopper, a base member 12 having a spiraled fluting 13 which in association with the casing 11 defines a spiraled passageway 14. A rotating member having a plurality of impellers 25 with dependent arms 45 rotates the curd and regulates its movement along the spiraled passageway 14 downwardly around the base 12. Cutting means in the form of a sharpened radial edge of the fluting 16 plus a circular rotating blade 17 cuts the curd into a ribbon.

The side-walls of the base member 12 are inclined about 15 degrees from the vertical. The spiraled fluting 13 is attached to the base at approximately 90° thus inducing the ribbon of curd to move radially inwardly toward the base 12. The spiraled fluting descends at an angle of 10–16° and has a smoothly polished surface so that relatively little force is required to cause the ribbon of curd to move down the spiraled passageway 14. The width and the spacing of the fluting gradually becomes smaller so that the cross-sectional area of the passageway becomes smaller as it approaches the bottom of the spiral.

The impellers 25 and their dependent arms 45 are connected to the rotatable member 18 which is driven by a suitable motor 19 through a gearing mechanism 20. The rotatable member 18 is supported by the platform 21 through a ring bearing.

The casing 11 comprises a plurality of outward opening hinged sections 15 supported by the frame of the casing 11.

A telescoping section 22 allows the hopper 10 to be raised or lowered by suitable means 23 to effectively increase or decrease the capacity of the hopper 10 in order to control the matting pressure on the curd, particularly for the starting up procedure.

A conveyor 24 at the outlet 35 removes the curd and may also be used to impart additional stretching.

The hopper 10 includes a perforated wall portion 26 and a collecting trough 27 for draining whey.

A retractable curd blocking member 28 prevents curd from entering the passageway 14 during the starting up procedure, which will be described hereinafter.

The rotatable member 18 has a constricting neck section 29 which forces the curd inward to facilitate matting.

The embodiment of FIG. 2 shows a number of twisting rams 37 which twist the ribbon of curd through 90°. The ramps are spaced equidistantly along the passageway 14 at approximately ¼, ½ and ¾ of the passageway length. Details of the ramps are shown in FIGS. 3 and 4. Each ramp 37 has two surfaces 46 and 47 connected perpendicular to one another at 48. One end of the ramp is twisted 90° with respect to the other end. At one end 49 the surface 47 is coincident with the fluting 13, and at the other end 50 the surface 46 is coincident with the fluting. In traversing the ramp the curd ribbon is progressively twisted through 90°. The ramps are connected to the base and have the same curvature as the fluting.

To aid in adjusting the temperature of the curd a portion of the fluting 13 is hollow and this hollow spacing is connected with conduits 36 to inlet and outlets 43 to allow for circulation of heating or cooling fluid as desired.

Numerous small perforations 30, shown in detail in FIG. 5 below the apex of the base member and at various points along the juncture between the fluting and the base member allow for whey drainage to the interior of the base member at 44.

In operation, after cooking the curd, the whey is drained by a suitable whey extracting machine and the curd is fed continuously or semi-continuously into the hopper 10. Additional whey drains from the curd through the perforated section 26 and is collected and conducted away by the whey collecting trough 27. The decreasing diameter of the upper part of the hopper and draining section begins the matting process. Additives such as caraway seeds, salt, flavor producing cultures and other materials may be mixed with the curd as it is transferred to this hopper.

In commencing a run with this machine the curd blocking member 28 is inserted between two flights near the top of the spiraled fluting 13. The rotatable member 18 remains stationary. When the hopper 10 is filled with curd, the curd blocking member 28 is withdrawn, and the rotatable member is driven at a rate of about one revolution every 12 minutes. The direction of rotation is clockwise when viewed from above. Fresh, drained curd can be fed more or less continuously to the hopper from this time on.

The combined effects which the matting and stretching actions have upon the curd are illustrated at FIGS. 1(a), (b) and (c). At FIG. 1(a) the curd is shown at the stage where matting is just beginning. At FIG. 1(b) this same quantity of curd has been compacted by the weight of the curd above and reduced in volume by approximately 25%, and stretching has just begun. In FIG. 1(c) the same quantity of curd is shown in the state where it is about to leave the machine. It still occupies the same volume but has now been stretched to approximately three to four times the length it had in FIG. 1(b). Its texture has changed from a curdy, granular condition to one similar to tender cooked meat and has a definite grain to it. The surface of the ribbon of curd will be comparatively free of openings.

The rate of movement of the curd is controlled by the rate of rotation of the impellers 25 and the dependent arms 45. Stretching or elongating of the ribbon is controlled largely by the dependent arms 45. The radius of the passageway 14 is progressively increasing as the ribbon spirals downwardly and outwardly around the base member 12, and hence the dependent arms 45, which necessarily rotate at the same rate, will exert a controlled stretching force on the ribbon.

The cone-shaped base member and casing need not be a true conical shape, but shaped to provide a spiraled passageway having an increasing radius in its downward path. FIG. 1 shows the base member having an upper cylindrical section 46 above the restricted section 29. FIG. 1 also shows that the spacing between the base and casing decreases in the downward direction which in conjunction with reduced spacing of vertically adjacent flutings 13 provides a spiraled passageway of decreasing cross-sectional area.

Although the above description is directed to Cheddar cheese it is not limited thereto. The present invention may be applied to the manufacture of other varieties of cheese where the matted curd is subjected to a maturing period where the curd is stretched. The invention may be used where the curd following removal of the whey is formed by typical batch methods or continuous methods.

What is claimed is:

1. A continuous process of treating cheese curd comprising separating whey from the curd, feeding the curd into a hopper, matting said curd by allowing said curd to pass substantially vertically downwardly through a restricted section under gravity onto the apex of a spirally fluted cone-shaped base disposed about a substantially vertical axis, continuously rotating the curd and moving it by impeller means into and along a spiraled passageway formed by the fluting between the cone-shaped base and a cone-shaped casing coaxially surrounding the base from top to bottom, cutting the curd into a continuous ribbon as it enters the spiraled passageway, stretching the curd ribbon as it spirals downwardly and outwardly around the base in the spiraled passageway, and continuously discharging the treated curd from the bottom of the spiraled passageway at the bottom of the cone base through an outlet in the casing.

2. The process of Claim 1 including twisting said ribbon of curd.

3. The process of Claim 1, whereby in starting the process a greater mass of curd is fed to the hopper to provide a greater degree of matting before rotation is begun.

4. The process of Claim 1, further comprising heating or cooling of the fluting to maintain the curd at a predetermined temperature.

5. Apparatus for continuously treating cheese curd comprising a curd receiving hopper, a truncated cone-shaped casing disposed below said hopper, a cone-shaped base member disposed within and spaced from said casing, the base member and the casing being disposed about a common, substantially vertical axis, said base member having a spiraled fluting that spirals downwardly around the base member which in association with said casing defines a spiraled passageway for the curd, a tubular rotatable member disposed coaxially above and contiguous with the casing between said hopper and said casing, said tubular rotatable member forming a passageway for the curd from the hopper to the spiraled passageway and having a restricted neck section in the region of the upper portion of the spiraled fluting, cutting means associated with an upper portion of the fluting for cutting said curd into a ribbon, a plurality of impellers attached to said rotatable member for rotating said curd and moving it into and along said spiraled passageway, and an outlet in said casing for discharging the treated curd.

6. The apparatus of Claim 5 having a dependent arm attached to each of said impellers for stretching and regulating the movement of said curd in said passageway.

7. The apparatus of Claim 6, wherein the fluting includes a plurality of curd ribbon twisting ramps, each of said ramps defining first and second surfaces perpendicular to one another, one end of said ramp being twisted through substantially 90° relative to the other end, said ramp being positioned such that at one end of the ramp said first surface is coincident with said fluting and at the other end the second surface is coincident with said fluting, whereby the curd ribbon is progressively twisted through 90° in traversing said ramp.

8. The apparatus of Claim 5, including a telescoping tubular section interconnecting said hopper to increase and decrease, respectively, the capacity of said hopper.

9. The apparatus of Claim 8, wherein at least a portion of the fluting is hollow such that a cooling or heating liquid may be circulated therethrough to regulate the temperature of said curd.

10. The apparatus of Claim 9, comprising a powered conveyor at said outlet to apply tension to said curd ribbon upon egress from said outlet.

11. The apparatus of Claim 8, wherein said hopper includes a screened wall portion for draining whey.

12. The apparatus of Claim 8, comprising retractable curd blocking means disposed in said casing at an upper region of said passageway.

References Cited
UNITED STATES PATENTS

| | | | |
|---|---|---|---|
| 3,543,403 | 12/1970 | Speglic et al. | 99—116 |
| 2,982,655 | 5/1961 | Budd et al. | 99—116 |
| 3,523,366 | 8/1970 | Baxter | 99—116 X |

DAVID M. NAFF, Primary Examiner

U.S. Cl. X.R.

99—460, 466; 426—36, 512, 518